United States Patent
Loef et al.

(10) Patent No.: US 7,050,539 B2
(45) Date of Patent: May 23, 2006

(54) POWER SUPPLY FOR AN X-RAY GENERATOR

(75) Inventors: Christoph Loef, Aachen (DE); Arne Lunding, Norderstedt (DE); Heiko Osterholz, Oststeinbek (DE); Heinz Van Der Broeck, Zuelpich (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 65 days.

(21) Appl. No.: 10/497,620

(22) PCT Filed: Dec. 5, 2002

(86) PCT No.: PCT/IB02/05123

§ 371 (c)(1),
(2), (4) Date: Jun. 2, 2004

(87) PCT Pub. No.: WO03/049270

PCT Pub. Date: Jun. 12, 2003

(65) Prior Publication Data

US 2005/0018815 A1    Jan. 27, 2005

(30) Foreign Application Priority Data

Dec. 6, 2001 (DE) ................. 101 59 897

(51) Int. Cl.
*H05G 1/10* (2006.01)

(52) U.S. Cl. ............ 378/105; 378/101; 378/106; 378/110; 378/112; 363/15; 363/59; 363/61

(58) Field of Classification Search .......... 363/16, 363/15, 65, 21.01, 21.02, 21.03, 59, 61; 378/101, 378/105–106, 110, 112, 59, 61
See application file for complete search history.

(56) References Cited

U.S. PATENT DOCUMENTS 4,024,453 A    5/1977    Corry (Continued)

FOREIGN PATENT DOCUMENTS

GB          2 057 168 A    3/1981

OTHER PUBLICATIONS

Junmine Sun, Hitoshi Konishi, Yoshio Ogino, Mutsuo Nakaoka, Series Resonant High-Voltage ZCS-PFM DC-DC Converter for Medical Power Electronics, Jun. 18-23, 2000, IEEE, Power Electronics Specialist Conference 2000, Galway, vol. 3, p. 1247-1252.*

C. Loef, Analysis of a Full-Bridge LCC-type Parallel Resonant Converter with Capacitive Output Filter, Jun. 22-27, 1997, IEEE, Power Electronics specialist Conference 1997, St. Louis, Mo., vol. 2, p. 1402-1407.*

*Primary Examiner*—Allen C. Ho
*Assistant Examiner*—John Corbett
(74) *Attorney, Agent, or Firm*—Douglas B. McKnight (57) ABSTRACT

A power supply for X-ray generators which includes at least one inverter (11, 12, 13), at least one transformer (111, 121, 131) and at least one voltage cascade (112, 122, 132) for generating a supply voltage for an X-ray tube (15). In order to increase the output power that can be achieved with a comparatively small weight and a low ripple or output capacitance, the voltage cascade is conceived in respect of its capacitances and the stray inductance of the transformers (111, 121, 131) in such a manner that it can be made to operate in the resonance mode by appropriate control of the inverter. In respect of the properties mentioned it is notably advantageous to integrate a two-phase embodiment or three-phase embodiment with an X-ray system so as to form a compact tank generator.

6 Claims, 6 Drawing Sheets

U.S. PATENT DOCUMENTS

| | | |
|---|---|---|
| 4,378,501 A | 3/1983 | Cowell ................ 378/97 |
| 4,481,654 A | 11/1984 | Daniels ................ 378/110 |
| 4,541,041 A | 9/1985 | Park et al. |
| 4,679,129 A | 7/1987 | Sakakibara et al. |
| 4,995,069 A * | 2/1991 | Tanaka ................ 378/200 |
| 5,285,372 A | 2/1994 | Huynh et al. |
| 5,602,897 A | 2/1997 | Kociecki ................ 378/101 |
| 5,731,968 A * | 3/1998 | Van Der Broeck et al. ... 363/71 |
| 5,949,321 A * | 9/1999 | Grandmont et al. ........ 336/232 |
| 6,477,062 B1 | 11/2002 | Wagner et al. |
| 6,563,717 B1 * | 5/2003 | Lunding et al. ............ 363/15 |
| 6,674,836 B1 * | 1/2004 | Harada et al. ............ 378/107 |

* cited by examiner

POWER SUPPLY FOR AN X-RAY GENERATOR

BACKGROUND

The invention relates to a power supply which includes at least one inverter whereto at least one voltage cascade (voltage multiplier) is connected, that is, notably a multiphase cascade, in order to convert an input voltage applied to the input of the inverter into an output DC voltage (supply voltage), notably a high voltage for X-ray generators or rotating X-ray systems, for example, in computed tomography apparatus, or for single-tank generators. The invention also relates to a corresponding X-ray system.

X-ray systems generally include an X-ray source with an X-ray tube for generating X-rays, as well as an X-ray generator with a power supply (high-voltage generator) which includes a mains supply circuit and delivers the high voltage required for operation of the X-ray tube. When the X-ray source and the components generating the high voltage are combined so as to form one structural unit, such a unit is also referred to as a single tank generator.

For operation of X-ray tubes anode voltages of, for example, approximately 150 kV (in the case of single-pole power supply) or approximately +/−75 kV (in the case of double-pole power supply) are required between the anode and the cathode. Numerous requirements are imposed on these voltages or on the circuits whereby these voltages are generated. In order to avoid fluctuations of the X-ray intensity generated, the voltages should be as constant as possible and exhibit a low ripple only. In order to achieve this, an increasingly larger output capacitance is required for smoothing the voltages as the output powers increase at a given switching frequency of the inverter.

For fast control of the output voltage and the output current (for example, in the pulsed mode of the X-ray tube) and notably for fast reduction of the output voltage in the case of small currents, however, an as small as possible output capacitance is to be pursued; this output capacitance should also be as small as possible in order to limit the load for the X-ray tube in the case of a failure.

Furthermore, for application-specific or structural reasons (not elaborated herein) it may also be advantageous to utilize a single-pole supply voltage. The voltage of, for example, 150 kV to be realized in such a case imposes special requirements on the design of the high-voltage tank.

For the application in single-tank generators and in rotating X-ray systems, for example, as used in computed tomography apparatus (CT apparatus) a low weight and small volume are of special importance. These systems are notably those which operate at a rotary speed of several revolutions per second, for example, sub-second scanners in which centrifugal forces of 30 g or more may occur.

U.S. Pat. No. 4,995,069 discloses a power supply for an X-ray tube, notably for a CT apparatus, in which the alternating voltage present on the input is first rectified by means of a rectifier. In order to generate a double-pole supply voltage for the X-ray tube, for each pole a respective inverter for generating an alternating voltage is connected to the rectifier and a transformer for stepping up to the alternating voltage to an intermediate voltage is connected to the output of said inverter. For each pole the necessary anode or cathode voltage is then formed from these intermediate voltages by means of a voltage cascade. In order to save weight on the rotating part of the CT apparatus, the input voltage source, the rectifier, the inverter and the transformers are mounted on a stationary part, the secondary connections of the transformers being connected to the inputs of the voltage cascades via slip rings and slip contacts. However, this approach is considered to be detrimental, because the slip rings and slip contacts are subject to a comparatively high degree of wear, notably in the case of high numbers of revolution and/or high electric powers, and require frequent maintenance work Therefore, it is an object of the invention to provide a power supply which is suitable notably for operation of an X-ray tube in a rotating X-ray system and has a particularly low weight and small volume in comparison with its output power.

It is also an object of the invention to provide a power supply of the kind set forth in which fast control of the output voltage and the output current is possible also for a high output power and a low ripple.

Finally, it is an object of the invention to provide a power supply which is also advantageously suitable for generating a single-pole supply voltage.

SUMMARY

This object is achieved by means of a power supply which includes at least one inverter whereto at least one voltage cascade is connected in order to convert an input voltage applied to the inverter into an output DC voltage, which power supply also includes a control circuit for generating a switching voltage whereby the at least one inverter can be made to operate at a switching frequency such that a resonance current is impressed in the at least one voltage cascade.

An advantage of this solution resides in the fact that in the resonance mode the output power can be varied with a very steep characteristic by way of a comparatively small variation of the switching frequency and/or the pulse duty factor with which the inverter (inverters) is (are) controlled.

This solution also offers a significant saving of weight, because it does not require large transformers and large smoothing capacitors, thus advantageously enabling the realization of mobile X-ray systems.

On the other hand, if the saving of weight is dispensed with, such proportioning can be chosen that a particularly low ripple or high output power are achieved.

A further advantage of this solution resides in the fact that, notably in the case of high output powers, the power loss incurred is distributed better among the components, so that they are subject to a significantly smaller load.

The dependent claims relate to advantageous further embodiments of the invention.

The embodiment as disclosed in claim 2 enables simple control of the resonant current in the cascade, and hence of the output power, by changing the control of the inverter. This embodiment is particularly suitable for a pulsed mode operation of an X-ray tube.

The embodiment disclosed in claim 3 is particularly advantageous in view of its low weight, because the voltage cascade is formed exclusively by diodes and capacitors whose electric strength may be small in conformity with the number of stages in the cascade and for smoothing the output voltage it suffices to use a smoothing capacitor having a comparatively small capacitance which may even be realized in the form of a cable capacitance.

The embodiment disclosed in claim 4 offers the advantage that, in comparison with known power supplies with voltage multipliers of the cascade type, the transformer can be constructed so as to be significantly smaller for the same output capacitance when a further reduction of the ripple of the output voltage is dispensed with. In comparison with the known voltage cascades a substantial reduction of the weight of the power supply or a significantly more attractive ratio of the output power of the circuit on the one hand to its weight on the other hand can thus be achieved. Notably in the case of rotating X-ray systems, for example, computed tomography apparatus, the X-ray source and all components of the power supply can then be advantageously mounted on the rotating part, so that only a comparatively low input voltage has to be conducted via the slip rings and slip contacts.

The embodiment disclosed in claim 5 offers the advantage that the capacitances required can be further reduced. In particular a very small ripple of the output voltage can be achieved without providing additional supporting or smoothing capacitors in the cascade stages.

The embodiment in conformity with claim 6 is advantageous for a particularly compact and space-saving realization.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

Further details, features and advantages of the invention will become apparent from the following description of preferred embodiments which is given by way of example and with reference to the drawing. Therein.

DETAILED DESCRIPTION

Figure 1:
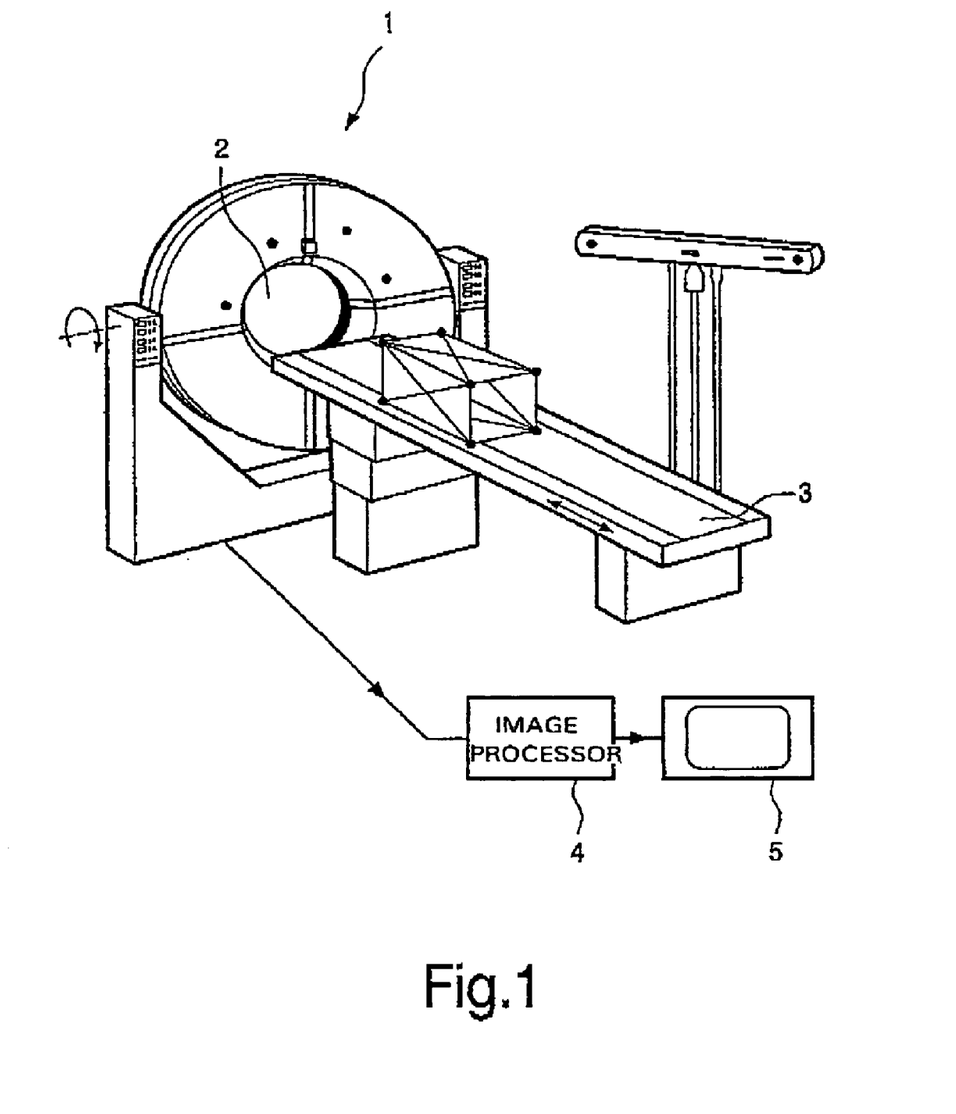
FIG. 1 is a diagrammatic representation of a computed tomography apparatus for examining a patient.

FIG. 1 is a diagrammatic representation of a computed tomography apparatus 1 which includes an opening 2 in a patient to be examined, positioned on a table 3, is introduced. At the same time an X-ray system as well as a suitable detector rotate around the patient within the apparatus 1, that is, essentially along the circumference of the opening 2, so that the patient is scanned in known manner. A computer-aided processing device 4 forms a tomographic image from the acquired image data; this image is displayed on a monitor 5. The principle of such an apparatus is known so that it need not be further elaborated herein It is especially important to realize a low weight, because the X-ray system rotates around the patient at a speed as high as several revolutions per second. The power supply represents a substantial part of the overall weight of an X-ray system, that is, notably the transformer or transformers necessary for generating the high voltage required for operation of the X-ray tube.

Figure 2:
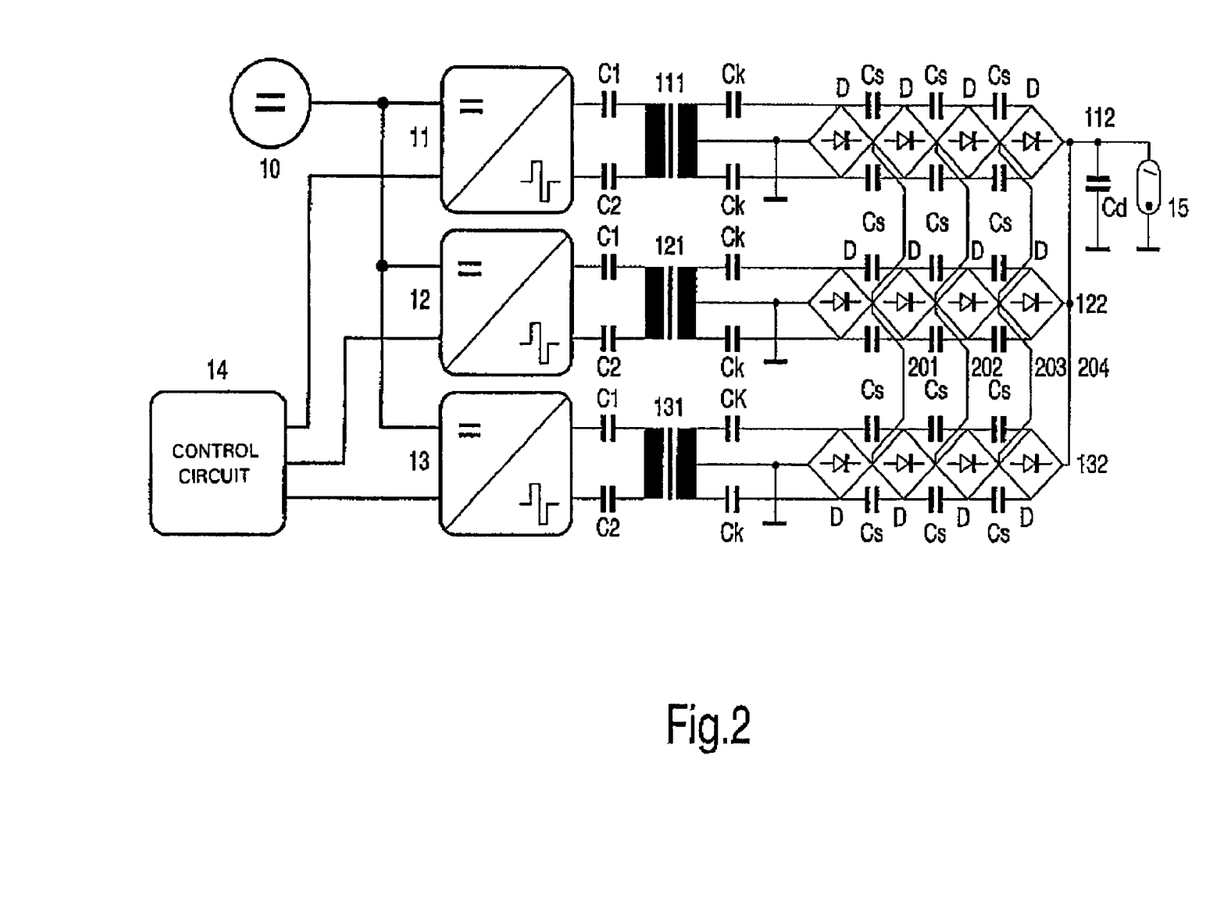
FIG. 2 shows a circuit diagram of a first embodiment of the invention.
Figure 3:
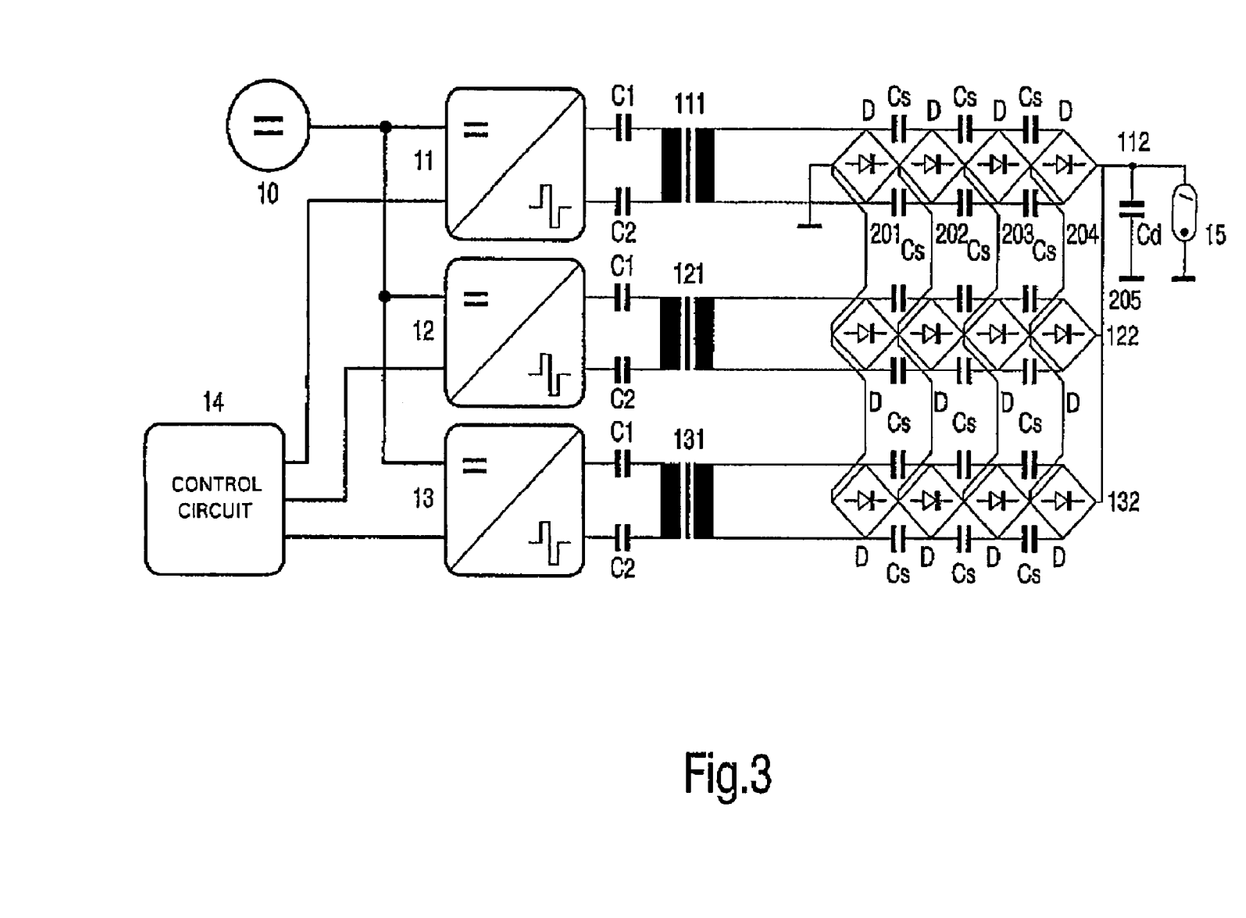
FIG. 3 shows a circuit diagram of a second embodiment of the invention.
Figure 4:
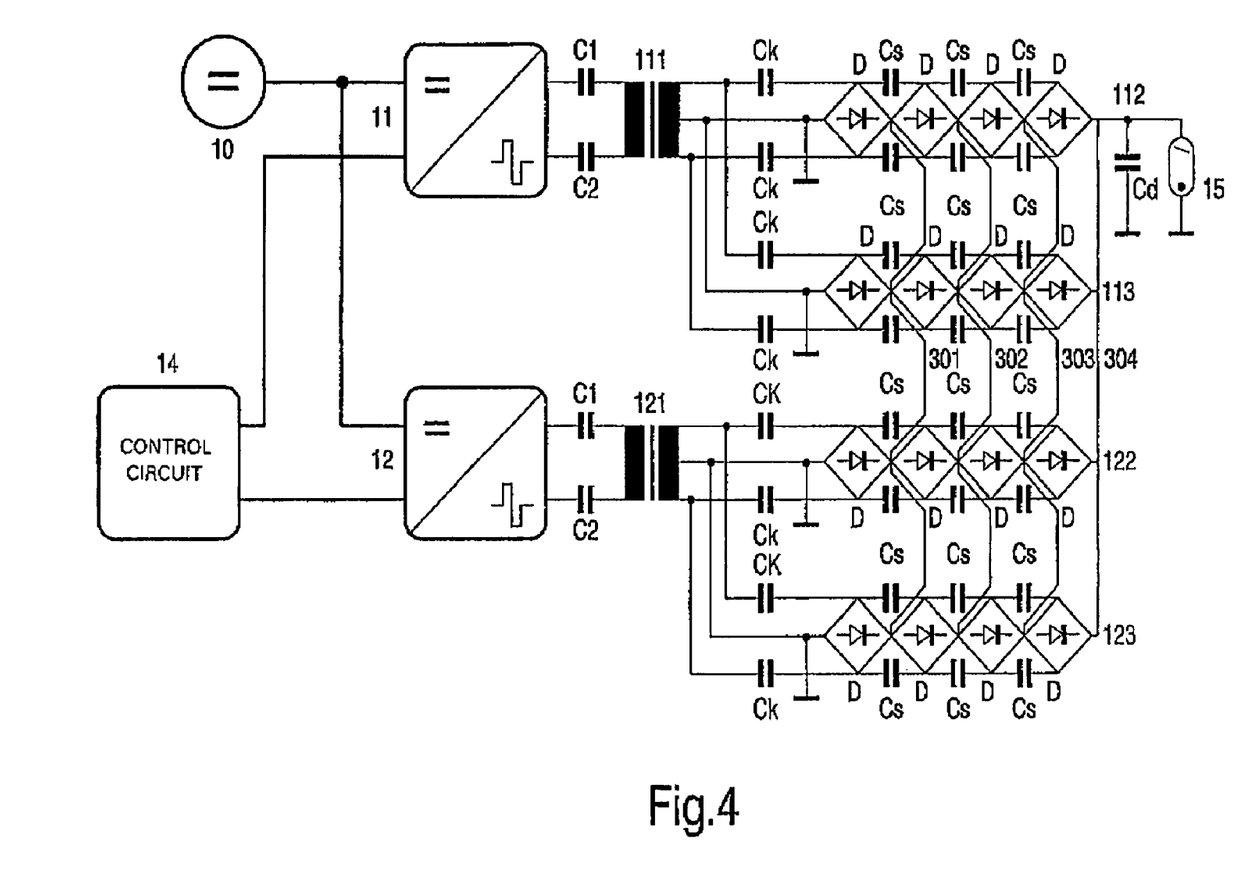
FIG. 4 shows a circuit diagram of a third embodiment of the invention.

FIG. 2 shows a first embodiment This circuit generates, like the other (second and third) circuits shown in the FIGS. 3 and 4, a single-pole positive high voltage (DC supply voltage) for an X-ray tube; this voltage is applied to the anode and the cathode is connected to ground. However, the anode could also be connected to ground potential and a negative high voltage could be applied to the cathode.

Even though only the single-pole control is described herein, the principle of the circuit in accordance with the invention can, of course, also be used for double-pole supply of an X-ray tube where the anode and the cathode carry equal voltages of different polarity.

The first circuit as shown in FIG. 2 is a three-phase circuit (three cascades) with four stages. Even though the effect of the invention is described in detail hereinafter with reference to a three-phase embodiment, it will be evident to those skilled in the art that the invention can also be realized in the form of a cascade with two, four or more phases. This also holds for a number of stages of the cascades which deviates from that in the embodiments described herein.

More specifically, the first circuit includes a first, a second and a third inverter 11, 12, 13 whose inputs carry a DC voltage 10 (input voltage or intermediate circuit voltage) which are connected at the output side, each time via a respective first and a second capacitor C1 and C2 as well as via a first, a second and a third (high voltage) transformer 111, 121, 131, respectively, to a first, a second and a third voltage cascade 112, 122, 132, respectively. The capacitors C1 and C2 form a respective series resonant circuit in conjunction with the stray inductance of the relevant transformer.

Each of the voltage cascades 112, 122, 132 comprises four stages which are composed of series-connected diode arrangements D and intermediate sliding capacitors Cs. The diode arrangements are realized, for example, in the form of respective diode bridge circuits.

A voltage cascade is connected to the relevant transformer via two decoupling capacitors $C_K$ which are connected to respective ends of a secondary winding of the transformer 111, 121, 131, as well as via a central tapping of this secondary winding which is connected to the center of the first diode arrangement as well as to ground. The outputs of the voltage cascades are connected in parallel, via a connection lead 204, and to an output smoothing capacitor Cd, which may also be realized in the form of a cable capacitance, as well as to the anode of an X-ray tube 15. The cathode of the X-ray tube 15 is connected to ground.

In as far as the capacitance of the output smoothing capacitor is not enough to achieve a required minimum ripple of the output voltage, a respective additional smoothing capacitor (not shown) may be connected between the voltage potentials of the diode bridge circuits D. Because the electric strength of these smoothing capacitors may be smaller than that of the output smoothing capacitor as a function of the number of cascade stages, the requirements imposed on these smoothing capacitors in this respect are comparatively mild.

The potentials of the stage voltages of the individual cascades of each phase are connected to one another via connection leads 201, 202 and 203 (as well as 204), so that the capacitances of the capacitors can be further reduced.

When the input voltage is an AC voltage, it is first rectified and then applied to the inverters 11, 12, 13.

The inverters 11, 12, 13 may be conventional half-bridge or full-bridge inverters whereby the DC voltage 10 is converted, for example, while utilizing series resonant circuits and semiconductor switches, into an AC voltage in known manner.

For the control of the inverters 11, 12, 13 there is provided a control circuit 14 which switches the semiconductor switches provided in the inverters, said switches generally being IGBTs. The three inverters are controlled cyclically in succession, so that the three AC voltages generated preferably exhibit the same phase shift (120 degrees) relative to one another (3-phase operation).

This requirement can be satisfied by appropriate design of the inverters 11, 12, 13 as well as of the control circuit 14 on the one hand and/or by suitable proportioning or adaptation of the stray inductance of the transformers as well as by a suitable choice of the capacitors on the other hand; the adjustment of these parameters, of course, is also dependent on the number of stages in each voltage cascade 112, 122, 132 and on the desired output power.

The capacitors C1, C2, the stray inductance of the first, the second and the third transformer 111, 121, 131 (possibly with additionally provided resonance chokes which are not shown), and the equivalent capacitance of the first, the second and the third cascade 112, 122, 132 connected to the relevant transformer constitute the essential elements of a respective resonant circuit In the case of resonance, that is, when the inverters 11, 12, 13 operate with a respective switching voltage whose frequency is a switching frequency tuned to the resonant frequency of these circuits, each resonant circuit impresses a resonance current in the connected cascade. The central tapping of the secondary winding can then define the reference potential (ground potential).

In the resonance mode, a respective resonance current flows in the cascades 112, 122, 132 and gives rise to a very high output power. Because this resonance current decreases comparatively steeply, that is, in comparison with the resonance mode, in response to a change of the switching frequency (pulse frequency) of the switching voltage used to control the inverters 11, 12, 13, such a change enables simple and very effective control of the output power of the power supply circuit by means of the control circuit 14. Because the output capacitance can be substantially smaller in comparison with a known circuit with the same output power and with the same ripple, this control can also be very fast.

Furthermore, such control is also possible by way of a change of the pulse duty factor of the switching voltage, that is, a change of the pulse length at constant pulse frequency, or by way of a combination of the two steps (switching frequency and pulse duty factor). To this end, the control circuit 14 is designed so as to be switchable or adjustable accordingly.

The inverters 11, 12, 13 can also be controlled by means of the method disclosed in the publication DE 199 55 673.3 (EP 0 099 3127.0) which is included in the present publication by way of reference.

FIG. 3 shows a second embodiment of the circuit; therein, elements which are the same as or correspond to elements of FIG. 2 are denoted by the same reference numerals, so that in this sense the description need not be repeated and only the differences will be dealt with.

As opposed to the first embodiment as shown in FIG. 2, the secondary windings of the transformers 111, 121, 131 do not have a central tapping in this second embodiment. This is because in the first embodiment different coupling factors of the secondary sub-windings of the transformers 111, 121, 131 may give rise to different current loads in the two sliding columns of a phase. Therefore, the second embodiment as shown in FIG. 3 is provided with a secondary winding which is not subdivided and does not include a central tapping. Consequently, the current loads in the two sliding columns of a phase are always identical. The reference potential on the input of the first cascade stage as well as the potentials of the stage voltages of the individual cascades 112, 122, 132 of each phase are again connected to one another via the connection leads 201 to 205.

This second circuit does not require any decoupling capacitors $C_K$ between the secondary windings of the transformers and the inputs of the first cascade stage. The required isolating voltage for these windings is thus reduced in comparison with that in the circuit shown in FIG. 2, that is, for the same capacitance values of the cascades.

For the remainder this circuit corresponds to the first embodiment shown in FIG. 2.

FIG. 4 shows a third embodiment of the invention in which parts and elements which are identical to or correspond to those of FIG. 2 are again denoted by the same references, so that in this sense the description need not be repeated again and only the differences will be dealt with The third embodiment is a two-phase type, an inverter 11, 12 being provided for each phase; to the output thereof there is connected a respective transformer 111, 121. Each time two voltage cascades 112, 113 and 122, 123, comprising four stages each, are connected in parallel to the secondary windings of the transformers. All voltage cascades 112, 113, 122, 123 are connected in parallel at the output side, via a connection lead 304, and to a smoothing capacitor Cd as well as to the anode of an X-ray tube 15 whose cathode is connected to ground.

For the remainder the circuit corresponds to the first embodiment shown in FIG. 2. Notably the potentials of the stage voltages of the individual cascades of each phase are again connected to one another via connection leads 301, 302 and 303 (as well as 304).

The operation of the inverters 11, 12, the transformers 111, 121 as well as the voltage cascades 112, 113; 122, 123 is essentially the same as described for the first embodiment as shown in FIG. 2 so that the description will not be repeated. This also holds for the choice of the switching frequency whereby the resonance is produced, in dependence on the capacitors C1, C2, the stray inductance of the transformers 111 and 121, as well as the relevant equivalent capacitance of the cascades 112, 113 and 122, 123, and a resonance current is impressed in the cascades.

The inverters 11, 12 are successively controlled by the control circuit 14 in such a manner that the two AC voltages generated exhibit a preferably equal phase shift relative to one another (2-phase mode). The output power is again adjusted by way of a change of the switching frequency and/or the pulse duty factor of the pulse voltage whereby the inverters 11, 12 are controlled.

The principle of the circuit in accordance with the invention is thus suitable for further increasing the peak power that can be achieved by means of cascades. Because of the comparatively low weight, compact single-tank generators can be realized for different power ranges and applications, that is, for the formation of photographic X-ray images as well as for the acquisition of moving images, and also for rotating X-ray systems.

Finally, it is particularly advantageous that the input transformer required for an n stage cascade has to generate an output voltage of only approximately $U_{r\bar{o}hre}/n$. This enables a significant reduction of the transformer components from a high voltage point of view. The same holds for the capacitors and diodes among which the powers are always comparatively uniformly distributed, so that they are loaded to a comparatively small extent only.

In order to illustrate the advantages which can be achieved, notably in respect of the loading of the components, by means of the first through third embodiments, the three-phase, four-stage design the second embodiment as shown in FIG. 3 will now be compared with a single-phase (FIG. 5) as well as with a two-phase (FIG. 6) design. It is assumed that the switching frequency of the inverters amounts to approximately 40 kHz and that a voltage of approximately 100 kV at a current of approximately 1 A is present on the output.

Figure 5:
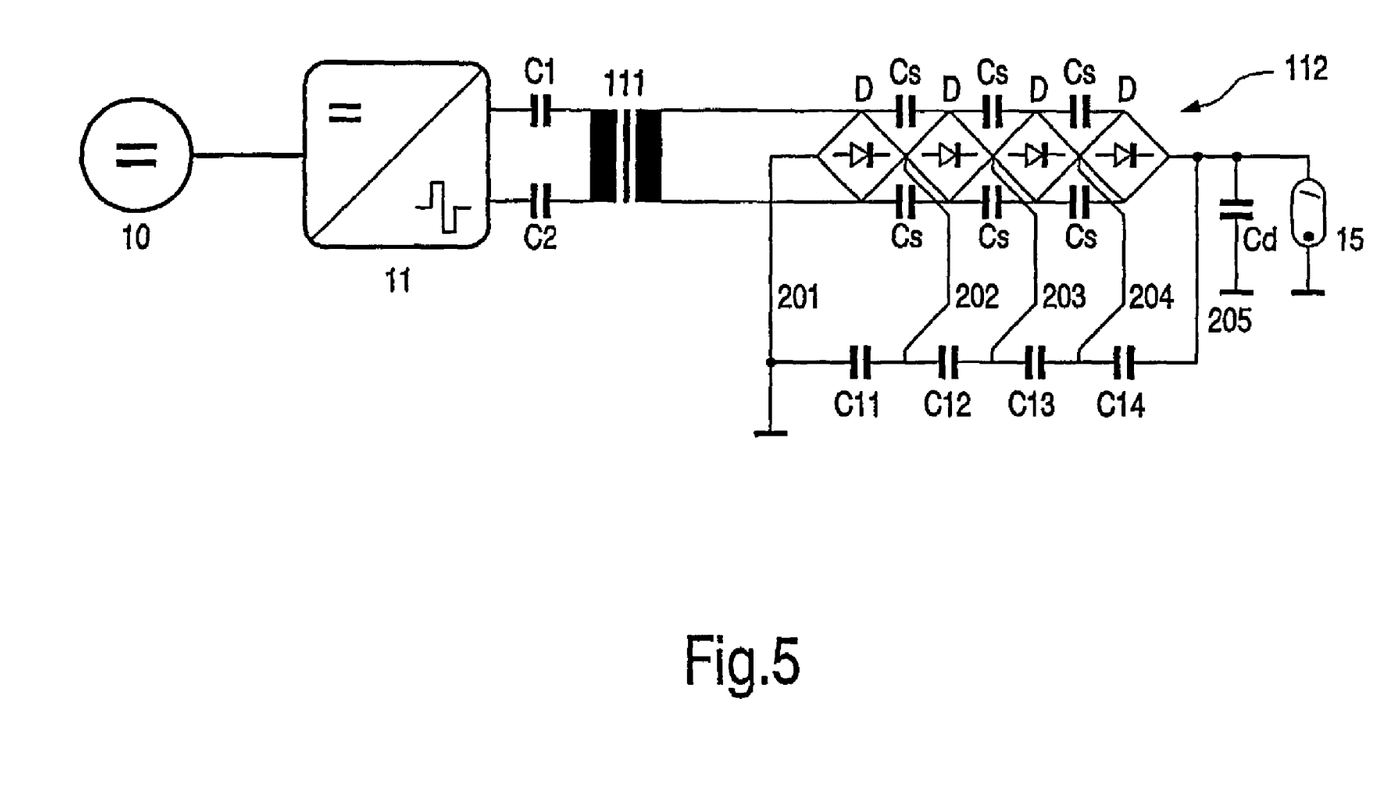
FIG. 5 shows a circuit diagram of a fourth embodiment of the invention.

A single-phase fourth embodiment of the invention as shown in FIG. 5 includes a four-stage cascade 112, a transformer 11 as well as an inverter 11, identical and/or corresponding parts and elements again being provided with the same references as used in FIG. 3. In comparison with the circuits shown in the FIGS. 2, 3 and 4 additional supporting capacitors are now required. For the application considered, a ripple $\delta U_a$ of the output voltage of approximately 4 kV, that is, approximately 4%, is obtained by means of four series-connected smoothing capacitors C11 to C14 which are connected, via respective connection leads 201 to 205, in each time one of the diode bridge circuits D and have a capacitance of approximately 1 nF each, as well as by means of six sliding capacitors Cs having a capacitance of each time approximately 11 nF. The mean current through the diodes then amounts to approximately 0.5 A.

Figure 6:
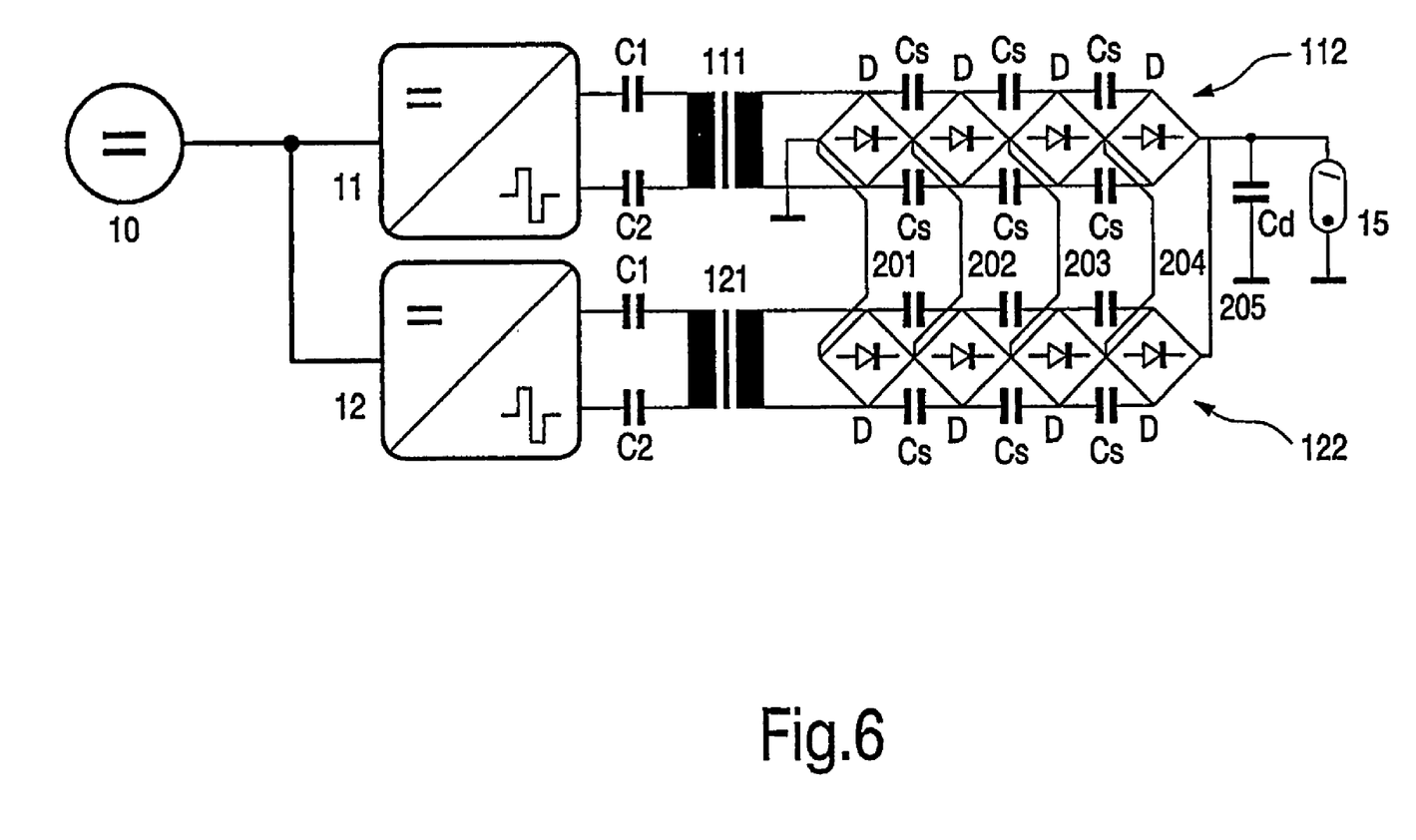
FIG. 6 shows a circuit diagram of a fifth embodiment of the invention.

A two-phase fifth embodiment of the invention as shown in FIG. 6 includes two four-stage cascades 112, 122, two transformers 111, 121 as well as two inverters 11, 12, identical and/or corresponding parts and elements again being denoted by the same references as used in FIG. 3. An output voltage ripple of approximately 2.4 kV, and hence 2.4%, is achieved by means of this circuit which includes six sliding capacitors Cs in each cascade with a capacitance of approximately 2.5 nF each. The mean value of the current through the diodes in each cascade then amounts to approximately 0.25 A.

Finally, an output voltage ripple of only approximately 0.7 kV (that is, 0.7%) is achieved by means of the three-phase embodiment with three cascades 112, 122, 132 as shown in FIG. 3, utilizing each time six sliding capacitors Cs in each cascade with a capacitance of approximately 1.5 nF each The mean value of the current through the diodes in each cascade then amounts to approximately 0.16 A.

This demonstrates that as the number of phases increases, the number of components increases accordingly, however, these components can nevertheless be proportioned so as to be significantly smaller while still achieving an essentially smaller ripple of the output voltage (for the same output capacitance of the voltage cascades), because the requirements imposed on the electric strength thus are less severe.

Conversely, for the same ripple the output capacitance could be reduced accordingly when (as described above), for example, in the pulsed mode particularly fast control of the output voltage or the output current on the X-ray tube is of importance.

Furthermore, the two-phase embodiment and notably the three-phase embodiment enable, because of the associated reduction of the output voltage of the transformers, the transformers to be realized in a planar technique and the primary and/or the secondary windings to be constructed in the form of inductances printed on the printed circuit board. A further saving of weight and a further reduction of the volume are thus achieved; these reductions are particularly attractive for the manufacture of tank generators and mobile X-ray systems.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A power supply comprising:
   at least two inverters;
   at least two transformers, each transformer having an input winding connected with one of the inverters and an output winding free of a center tap;
   a plurality of voltage cascades, each voltage cascade including a plurality of stages defined by diode bridges which diode bridges are connected with each other by (a) sliding capacitors and (b) stage connection points, at least one voltage cascade being connected across the center tap free output winding of each of the transformers; an output connection lead connecting a final stage of each of the voltage cascades with a power supply output; and
   a control circuit which generates a switching voltage applied to the inverters to operate to impress a resonance current on the voltage cascades.

2. A tank generator provided with an X-ray source and a high-voltage generator that includes a power supply as claimed in claim 1.

3. An X-ray generator provided with a power supply as claimed in claim 1.

4. The power supply as claimed in claim 1 further including:
   a plurality of connection leads, each lead connecting a corresponding stage of the voltage cascades.

5. The power supply as claimed in claim 1 further including:
   an x-ray tube connected with the output connection lead.

6. A CT scanner comprising:
   a power supply as claimed in claim 1;
   an X-ray tube powered by the power supply, the X-ray tube and a power supply mounted to a rotating gantry;
   a processor which reconstructs a tomographic image from image data from an X-ray detector on the rotating gantry;
   a monitor for displaying the reconstructed tomographic image.

* * * * *